US009691077B2

(12) United States Patent
Efrati et al.

(10) Patent No.: US 9,691,077 B2
(45) Date of Patent: Jun. 27, 2017

(54) SYSTEMS AND METHODS FOR MAKING AWARDS BASED ON TELEPHONY ACTIVITY

(75) Inventors: Tzahi Efrati, Givataim (IL); Amichay Oren, Rosh-a-ayin (IL)

(73) Assignee: VONAGE AMERICA INC., Holmdel, NJ (US)

( * ) Notice: Subject to any disclaimer, the term of this patent is extended or adjusted under 35 U.S.C. 154(b) by 0 days.

(21) Appl. No.: 13/211,557

(22) Filed: Aug. 17, 2011

(65) Prior Publication Data

US 2013/0044643 A1 Feb. 21, 2013

(51) Int. Cl.
*H04L 12/26* (2006.01)
*G06Q 30/02* (2012.01)

(52) U.S. Cl.
CPC ............... *G06Q 30/0207* (2013.01)

(58) Field of Classification Search
USPC ......... 370/252, 259, 271; 705/14, 28, 14.31, 705/32, 14.36, 14.39; 379/114.11, 379/114.12, 114.13
See application file for complete search history.

(56) References Cited

U.S. PATENT DOCUMENTS

| | | | |
|---|---|---|---|
| 5,991,376 A * | 11/1999 | Hennessy et al. | 379/114.1 |
| 6,298,125 B1 * | 10/2001 | Goldberg et al. | 379/114.1 |
| 7,068,776 B1 * | 6/2006 | Gamble | 379/355.05 |
| 7,640,032 B2 | 12/2009 | Jones | |
| 8,000,455 B1 * | 8/2011 | Van Haaften | G06Q 30/0267 341/50 |
| 2002/0136376 A1 * | 9/2002 | Fleischer et al. | 379/114.12 |
| 2003/0094489 A1 * | 5/2003 | Wald | 235/386 |
| 2004/0186770 A1 * | 9/2004 | Pettit | G06Q 20/387 705/14.27 |
| 2008/0104227 A1 | 5/2008 | Birnie et al. | |
| 2008/0182724 A1 * | 7/2008 | Guthrie | 482/8 |
| 2011/0010238 A1 * | 1/2011 | Postrel | G06Q 30/02 705/14.38 |
| 2011/0282722 A1 * | 11/2011 | Chopra et al. | 705/14.16 |
| 2012/0108201 A1 * | 5/2012 | Assem et al. | 455/406 |

FOREIGN PATENT DOCUMENTS

| | | |
|---|---|---|
| KR | 10-2004-0036793 | 5/2004 |
| WO | 2007-134376 | 11/2007 |

OTHER PUBLICATIONS

International Search Report issued in PCT/US2012/050846 on Feb. 28, 2013.
Written Opinion issued in PCT/US2012/050846 on Feb. 28, 2013.

* cited by examiner

*Primary Examiner* — Alvin Zhu
(74) *Attorney, Agent, or Firm* — Nixon & Vanderhye, P.C.; Joseph Pagnotta

(57) ABSTRACT

An award system associated with a telephony communications system analyzes one or more users' telephony activity to determine if the telephony activity satisfies certain predetermined award rules. If a single user's telephony activity satisfies one or more award rules, the system makes an award to the user. The making of an award can include posting the award on a social networking site with which the user is associated. The analysis can also include collecting information about a predetermined type of telephony activity for multiple users of the system, and determining which of the multiple users has experienced the most of the predetermined type of telephony activity. An award is then granted to those users who experienced the most of the predetermined type of telephony activity.

39 Claims, 6 Drawing Sheets

SYSTEMS AND METHODS FOR MAKING AWARDS BASED ON TELEPHONY ACTIVITY

BACKGROUND OF THE INVENTION

The invention is related to telephony systems that allow users to place and receive telephone calls, and to send and receive text and video messages. More specifically, the invention is related to telephony systems that make or grant awards to users based on the users' telephony activity.

Presently, no telephony systems make or grant awards to users based on their use of the telephony system. If awards are granted to users based on their level of activity on the telephony system, or based on specific types of communications activity, the granting of awards might increase use of the telephony system.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The technology is related to telephony systems generally. The technology encompasses systems and methods of granting awards to users of a telephony system based on their usage of the telephony system. While the following description will focus on a Voice over Internet Protocol (VOIP) telephony system, the invention is equally applicable to a telephony system that does not rely upon voice over Internet protocol technology. Thus, the description of a VOIP system should not be considered in any way limiting.

In the following description, the terms VOIP system, VOIP telephony system, IP system and IP telephony system are all intended to refer to a system that connects callers and that delivers data, text and video communications using Internet protocol data communications.

Figure 1:
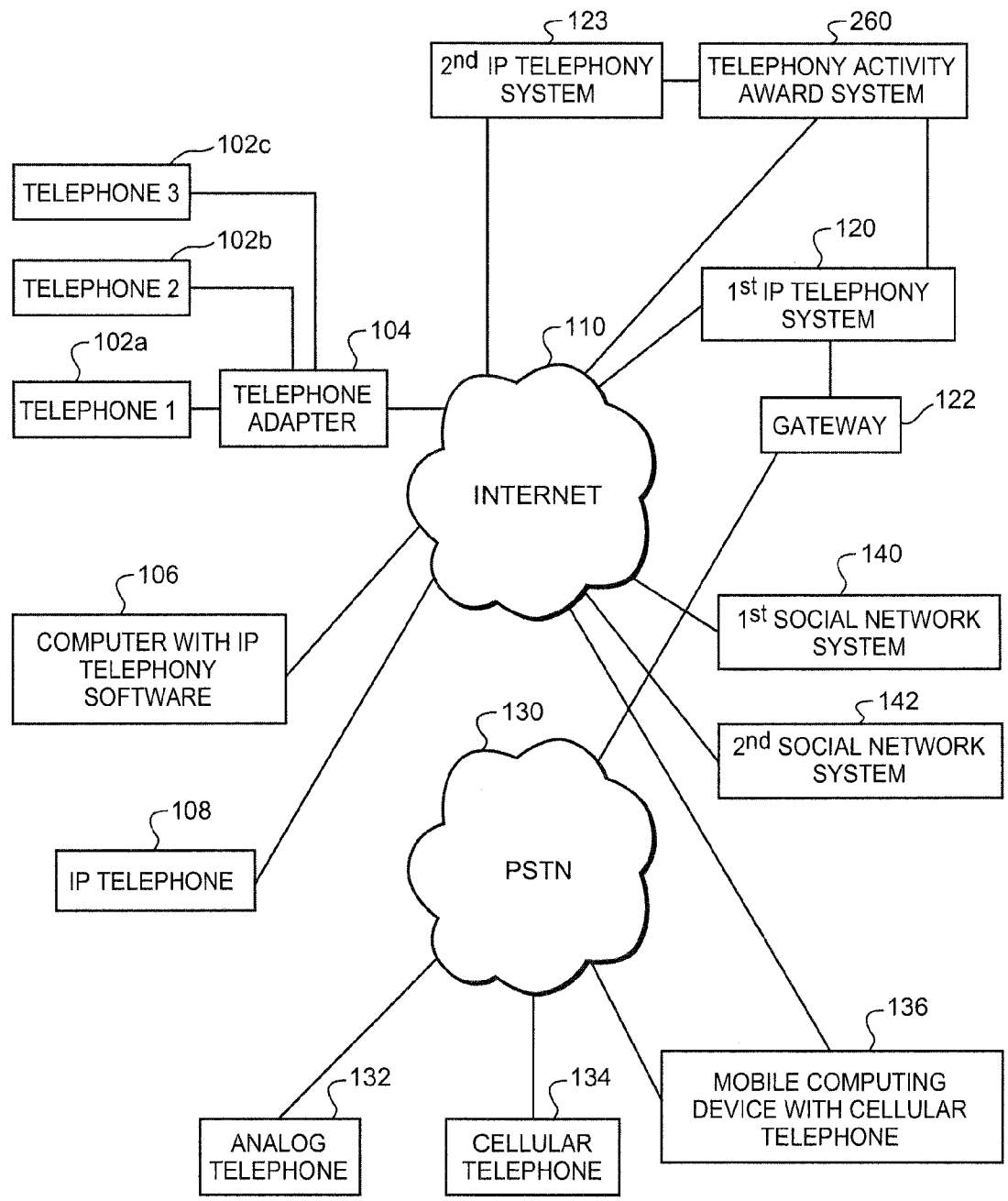
FIG. 1 is a diagram of a communications environment including various elements which are associated with a voice over Internet protocol (VOIP) telephony system operating in accordance with the invention, a typical publically switched telephone network (PSTN) and one or more social networking systems.

As illustrated in FIG. 1, a communications environment is provided to facilitate IP enhanced communications. An IP telephony system 120 enables connection of telephone calls between its own customers and other parties via data communications that pass over a data network. The data network is commonly the Internet 110. The IP telephony system 120 is connected to the Internet 110. In addition, the IP telephony system 120 is connected to the publicly switched telephone network (PSTN) 130 via a gateway 122.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a, 102b and 102c could all be coupled to the same telephone adaptor 104. Analog telephone devices include but are not limited to standard telephones and document imaging devices such as facsimile machines. A configuration using a telephone adapter 104 is common where all of the analog telephone devices 102a, 102b and 102c are located in a residence or business, and all of the telephone devices are connected to the same telephone adapter. With this type of a configuration, all of the analog telephone devices 102a, 102b, 102c share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 would then route the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the IP telephony system. A mobile computing device 136, as illustrated in FIG. 1, might connect to the PSTN 130 using its cellular telephone capabilities. However, such devices might also have the ability to connect wirelessly via some other means. For instance, a mobile computing device 136 might communicate with a wireless data router to connect the mobile computing device 136 directly to a data network, such as the Internet 110. In this instance, communications between the mobile computing device 136 and other parties could be entirely carried by data communications which pass from the mobile computing device 136 directly to a data network 110. Of course, alternate embodiments could utilize any other form of wireless communications path to enable communications.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120. Further, in some instances a user could place a telephone call with an analog telephone 132 or a cellular telephone 134 that is routed through the PSTN 130 to the first IP telephony system 120 via the gateway 122. This would typically be accomplished by the user calling a local telephone number that is routed to the first IP telephony system 120 via the gateway 122. Once connected to the IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the PSTN 130.

FIG. 1 also illustrates that a second IP telephony system 123 may interact with the first IP telephony system 120 via the Internet 110. For example, customers of the second IP telephony system 123 may place calls to customers of the first IP telephony system 120. In that instance, assets of the second IP telephony system 123 interact with assets of the first IP telephony system 120 to setup and carry the telephone call. The same basic thing could happen if customers of the first IP telephony system 120 place calls to customers of the second IP telephony system 123.

Each time that a customer of the IP telephony system 120 places a call or receives a call through the IP telephony system 120, a call detail record (CDR) is established for the call. The CDRs include various items of information about the call. For instance, the information included in a CDR would typically include the telephone number of the calling party, the telephone number of the called party, the time the call was established, the time the call ended, as well as various other items of information relating to the elements of the IP telephony system that handled the call.

Likewise, each time that a customer of the IP telephony system 120 sends or receives a text message, such as a SMS message, a MMS message, a video message and all other forms of communications, a record of the communication is created. The record can be stored along with the records of telephone calls as another CDR, or the record could take some other format.

In some instances, information about user calls could be received by a first IP telephony system 120 from a second IP telephony system 123, or from a PSTN provider. For example, the first IP telephony system 120 might receive information about a call that was setup for a user of the first IP telephony system by a partner provider, such as the PSTN 130 or the second IP telephony system 123. This information would be used to create a CDR for the call for that user.

As illustrated in FIG. 1, one or more social networking systems 140, 142 are also connected to the Internet 110. Social networking systems 140, 142 allow members to easily interact with one another via the Internet 110. Typically, each member of a social networking system 140, 142 will establish a presence on the social networking system 140, 142, which can include posting some basic information. Members then establish links to one another through the social networking system 140, 142. Once a link is established between first and second members, the first member can easily see information posted by the second member, and vice versa. Members of a social networking system 140, 142 are able to post information, text, Internet links, and photos, videos and other forms of media to the social networking system 140, 142.

In some instances, users access a social networking system 140, 142 using a computer. However, a user may also be able to access the social networking system 140, 142 using a cellular telephone 134 or a mobile computing device 136.

It is possible for a user of an IP telephony system 120 to provide the IP telephony system 120 with his credentials from a social networking system 140, 142, which gives the IP telephony system 120 the ability to access the information available to the user on the social networking system 140, 142. In addition, once the IP telephony system 120 has the user's credentials, the IP telephony system 120 can post information to the social networking system 140, 142 in the same way that the user can post information. And this information would be viewable by any other users of the social networking system 140, 142 that are linked to the first user.

Figure 2:
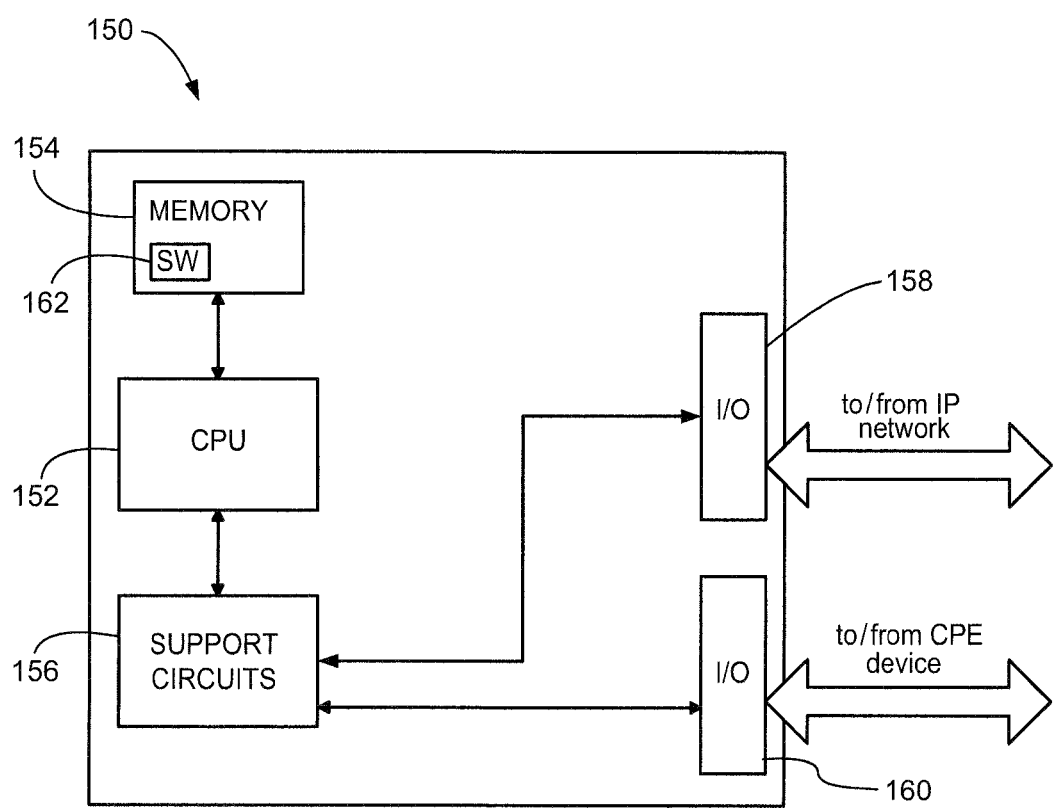
FIG. 2 is a diagram of various elements of a processor that forms part of a VOIP telephony system.

FIG. 2 illustrates elements of a computer processor 150 that can be used as part of the IP telephony system 120 to accomplish various functions. The IP telephony system 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software.

The following description will also refer to telephony communications and telephony activity. These terms are intended to encompass all types of telephone calls, regardless of whether all or a portion of the calls are carried in an analog or digital format. These terms are also intended to encompass data communications that are conveyed through a PSTN or VOIP telephony system, such as facsimile transmissions, text messages, SMS messages, MMS messages, video messages, and all other types of data communications sent by or received by a user. In other words, these terms are intended to encompass any communications whatsoever, in any format, which traverse all or a portion of a communications network or telephony network.

As mentioned above, systems and methods embodying the invention are designed to grant awards to users of a telephony system based on the users' telephony activity. The telephony activity could be a certain volume of a particular type of telephony activity initiated by the user himself. In other instances, the telephony activity could be the receipt of one or more telephone call initiated by another party. Thus, an award could be made to a user because of actions taken by the user, or because of actions taken by someone else who contacted the user.

The awards themselves could take many different forms. In some instances, an award might just be a named award that is granted to a user who satisfies certain telephony activity criteria. In other instances, a "badge" might be associated with an award. The badge for a particular award might have a design, illustration or logo that relates to the purpose of the award. In still other instances, an award might carry some real world value. For instance, the winner of an award might be granted a discount of the user's monthly service charge fee for using the telephony system. In other instances, an award might carry with it a certain number of free calling minutes. For instance, the winner of an international calling award might be granted a certain number of free international calling minutes. In still other embodiments, specific cash awards, or awards of products or services could be granted to the user who satisfies the award criteria.

Figure 3:
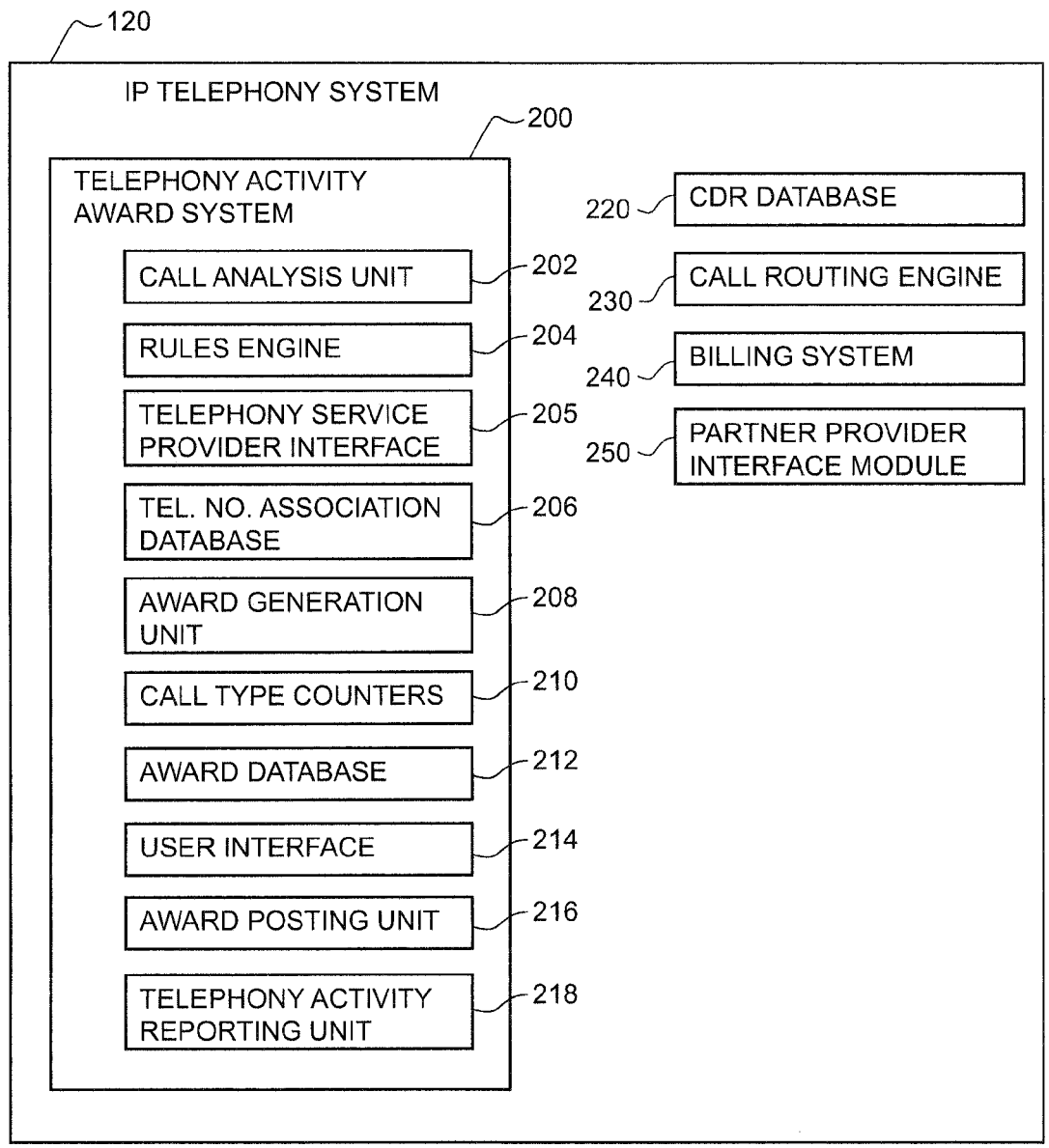
FIG. 3 is block diagram illustrating selected elements of a VOIP telephony system that includes a telephony activity award system configured to grant awards to users based on telephony activity.

FIG. 3 illustrates elements of an IP telephony system 120 that includes a telephony activity award system 200 configured to determine when to grant awards to users, and to make the actual grant of an award.

The IP telephony system 120 includes a CDR database 220 which stores records of all the incoming communications sent to each of the users of the IP telephony system 120, and well as all outgoing communications sent by the users. The CDR database 220 includes a record of telephone calls and other types of incoming and outgoing communications, such as text messages, SMS messages, MMS messages, video messages, and other forms of communications.

The IP telephony system 120 also includes a call routing engine 230. The call routing engine 230 provides instructions to servers of the telephony system 120 to help the servers establish communications channels between a calling party and a called party. The call routing engine 230 also helps servers to deliver text messages, SMS messages, MMS messages and other forms of communications.

The IP telephony system 120 further includes a billing system 240. The billing system 240 uses information drawn from the CDR database 220, and possibly other sources, to determine how much to bill the users of the IP telephony system 120.

The IP telephony system 120 also includes a partner provider interface module 250. This module communicates various items of information with partner providers who help to complete telephone calls for the IP telephony system in various locations throughout the world. The same partner providers may deliver incoming calls directed to users of the IP telephony system 120. In some instances, the partner providers may feed information about calls to the IP telephony system 120 via the partner provider interface module 250. This information could be used by the IP telephony system 120 to create CDRs for user calls. As explained below, this information could also be used to determine if a user has qualified for an award.

The telephony activity award system 200 determines when to grant awards to users based on their telephony activity. The telephony activity award system 200 also acts to grant the awards.

Although FIG. 3 illustrates the telephony activity award system 200 as being part of the IP telephony system 120, this may not always be the case. For example, the telephony activity award system may be completely separate from the IP telephony system 120, and it may be owned and operated by a separate entity. All that is required is that the telephony activity award system 200 be capable of interacting with elements of the IP telephony system 120 to acquire information about users' telephony activity so that the telephony activity award system 200 can determine when to grant awards to users.

FIG. 1 illustrates that a telephony activity award system 260 may be separate from, but connected to, the first IP telephony system 120, the second IP telephony system 123 and the PSTN 130. The telephony activity award system 260 receives information about user telephony activity from all three systems, and the telephony activity award system grants awards to users of all three systems based on the telephony activity of those users.

When the telephony activity award system 260 receives information from multiple telephony service providers, the telephony activity award system 260 can track a single user's activity on multiple systems. Thus, activity on multiple different telephony service provider systems might count towards the grant of a particular award.

In the embodiment illustrated in FIG. 3, a telephony activity award system 200 is part of a first IP telephony system 120. However, even in this instance, the telephony activity award system 200 could grant awards both to users of the IP telephony system 120 and to users of a second telephony system for their use of the second telephony system. In this instance, the telephony activity award system 200 receives information about users telephony activity on a separate telephony system through the partner provider interface module 250, or through a telephony service provider interface 205. The received information could be similar to the CDR data stored in the CDR database 220 of the IP telephony system 120. The telephony activity award system could then compute and make awards to users of the other telephony system.

Allowing a telephony activity award system created and maintained by a first telephony service provider to act for other telephony service providers would eliminate the need for the other telephony service providers develop their own award systems. This could result in a substantial cost savings for the other telephony service providers, and it would provide a source of revenue for the telephony service provider that did the initial development and which provides the award service.

The telephony activity award system 200 also includes a rules engine 204 that specifies what a user must do to earn particular awards. In some instances, where an award can be earned by a user for engaging in a particular amount of a particular type of telephony activity, the rules engine 204 would specify the amount of that activity that is required for each such award. For example, the rules engine 204 might specify that a user can receive a "Devoted Spouse" award if the user calls the user's spouse at least once a day for a consecutive seven day period. Another example might be an "International Caller" award that is granted to all users who place ten international telephone calls within a thirty day period. Awards might also be granted to users that place a certain number of calls to a particular type of business. For example, a "Pizza Lover" award might be granted to a user who places more than three calls to a pizza delivery business within a single week.

Some awards might not be granted because a user engaged in a certain level of a particular type of telephony activity, but rather because the user engaged in more of that type of telephony activity than any other user, or any of a group of users. For example, if a user sent more communications to a particular geographic location than any of the other users over a predetermined period of time, that might cause an award to be granted to the user. And where relative telephony activity is used to determine who is to be granted an award, the award might include a first, second and third place award.

Further, and as mentioned above, an award may be granted to a user not because the user initiated a certain amount of telephony activity, but because the user received one or more telephone calls from a particular person or entity. Thus, the grant of an award to a user can be triggered by the actions of people other than the user.

Virtually any type of award could be created that is granted based on any rule regarding telephony activity. And although the above examples are related to telephone calls, certain awards could also be granted for other types of telephony activity, such as text messaging.

If the telephony activity award system 200 also acts for other telephony service providers, those telephony service providers may have other types of awards than the IP telephony system 120. Also, each telephony service provider might set different qualifications for the same type of award. Thus, the rules engine 204 may store different awards and different award qualifications for each telephony service provider. And the individual telephony service providers may be capable of accessing and modifying those award qualifications stored in the rules engine 204 through a telephony service provider interface 205.

In some situations, the telephony activity award system 200 may report a user's telephony activity to a third party who grants an award based on that activity. In this type of a situation, a telephony activity reporting unit 218 of the telephony activity award system may automatically report a user's telephony activity to the third party. The reporting of a user's telephony activity could occur each time a triggering event occurs, or only after a user's telephony activity has satisfied some predefined criteria, as may be defined in the rules engine 204.

For example, a pizza shop may award a user a free pizza if the user has made ten calls to the pizza shop within a 30 day period. In this situation, the telephony activity reporting unit 218 may automatically report to the pizza shop each time that a user places a call to the pizza shop. Alternatively, the telephony activity award system 200 may track calls that the user places to the pizza shop, and a notification may be sent to the pizza shop if the user makes ten calls to the pizza shop within a 30 day period.

Where a third party business grants awards to users based on the users' telephony activity, the third party business may have the ability to access the rules engine 204 to set or modify the qualifications for an award. Thus, the rules engine 204 may store different awards and different award qualifications for various third party businesses. The individual third party businesses may be capable of accessing and modifying those award qualifications stored in the rules engine 204 through a telephony service provider interface 205.

As is apparent from the above description of some types of awards that could be granted, it is necessary for the telephony activity award system 200 to know the associations between certain telephone numbers, and the class of people or businesses that are reachable via those telephone numbers. For example, in order to determine if a user qualifies for the "Devoted Spouse" award, it is necessary to know the spouse's telephone number so that the system can determine if the user placed calls to that telephone number for seven consecutive days. Likewise, to determine if the user is entitled to receive the "Pizza Lover" award, the system needs to know that certain telephone numbers to which the user has placed calls are the telephone numbers for pizza delivery businesses.

The telephony activity award system 200 includes a telephone number association database 206 which enables the system to make associations between telephone numbers, and the people and businesses that are reachable via those telephone numbers. During an initial setup and registration process, a user would review the telephone numbers to which the user sends communications and from which the user receives communications, and the user would indicate the people or class of people associated with those telephone numbers. For example, rather than indicating the name of the person associated with a telephone number, the user could indicate that the number is associated with the user's spouse, or the user's mother, or the user's boss.

The user might also be able to identify businesses associated with certain telephone numbers. In the case of telephone numbers associated with businesses, the telephony activity award system 200 could itself obtain this information from commercially available telephone number databases. Specifically, the telephone number association database 206 may interface with external and/or commercial databases to obtain the telephone numbers of certain businesses, or to obtain information about businesses that are tied to particular telephone numbers.

A user interface 214 of the telephony activity award system 200 may be utilized to indicate the people, classes of people or businesses associated with certain telephone numbers. And a user could periodically check lists of telephone numbers to which the user has sent communications or from which the user has received communications to determine if any new telephone numbers require classification. Over time, the telephony activity award system 200 will learn the associations for most or all of the telephone numbers to which the user sends communications or from which the user receives communications. Also, when a new number appears, which has not previously been classified by the user, the telephony activity award system 200 may proactively contact the user to ask for an association for that new telephone number.

A particular telephone number could be associated with more than one category. For example, someone working at a doctor's office could be the spouse of a user. The user would associate that telephone number with the user's spouse. But the same telephone number could also be associated with a health care provider's office.

Further, incoming and outgoing communications may not always be associated with a telephone number. Instead, incoming and outgoing communications may be associated with some other type of identifier. In those instances, the user is still able to utilize the user interface 214 to identify the class of individual or the business associated with each identifier that is tied to an incoming or outgoing communication. Although an identifier, rather than a telephone number, would be associated with the identified classes of individual or business, this information would also be stored in the telephone number association database 206.

The user interface 214 may also provide the user with a listing of the awards that a user has earned. This could include an identification of awards that the user is in the process of earning, with an indication of the remaining telephony activity that would be required before the user is able to earn the award. Thus, viewing awards that are almost achieved may provide additional incentive for a user to send or receive communications via the telephony system.

The telephony activity award system 200 also includes a call analysis unit 202. The call analysis unit 202 reviews user telephony activity and compares that activity to the rules in the rules engine 204 to determine if a user has earned an award. The review of user telephony activity can be accomplished in real time, immediately after a user call has been placed or completed. Alternatively, the review could be done in a batch mode during off peak hours when idle processing capability is available. Also, where an award is to be granted for relative level of telephony activity, the call analysis unit 202 would compare the telephony activity from multiple users to determine which users engaged in the most of that type of telephony activity.

The call analysis unit 202 could obtain information about the user's telephony activity from the CDR database 220, and/or from other sources. For example, the information may come from one or more partner providers via the partner provider interface module 250, or possibly via the telephony service provider interface 205. In some instances, where an award is granted for a certain level of telephony activity that occurs over a predetermined period of time, the call analysis unit 202 would only need to obtain and review call detail records generated for activity occurring during that predetermined period of time.

If certain awards are granted after a user has engaged in a predetermined level of a specific type of telephony activity, each time that a user engages in the required type of telephony activity, the occurrence of that telephony activity could be recorded in a call type counter 210. Of course, the recording of certain telephony activity could be performed even where no current awards call for that type of telephony activity. Then, if an award calling for that type of telephony activity is established in the future, the information about who has engaged in that type of activity will already be available.

Although the word "call" is used, the call type counters 210 could record telephony activity other than telephone calls, such as text messaging and other forms of communications. The call analysis unit 202 could then easily determine when a user has engaged in a sufficient amount of the required telephony activity to be granted the specified award. This would also eliminate the need for the call analysis unit 202 to review a large number of call detail records for a particular user, that stretch over a long period of time, to determine if the user has engaged in a sufficient amount of the required activity to be granted an award.

Another way that that call type counters 210 could be used is when multiple users are in competition for an award that is granted based on relative amounts of a particular type of telephony activity. For example, if an award is to be granted to the user who places the largest number of calls to a particular geographical location over a one week period, each time that a user places such a call, that occurrence could increment a counter for that user. At the end of the one week period, the call analysis unit 202 would only need to review the counters for each user to determine the winner of the award.

When the call analysis unit 202 determines that a user is entitled to receive an award, the award posting unit 216 would make the actual grant of the award. This could include posting the award in the award database 212, and making the award available for viewing via the user interface 214. The award posting unit 216 could also send a communication to the user to inform the user that the award has been granted to the user. Further, if the user receiving the award is a user of a different telephony service provider, a notification of the award could also be sent to the user's telephony service provider.

As noted above, certain users of an IP telephony system 120 may also be users of social networking systems 140, 142. It is also possible for the telephony activity award system 200 to post awards to the user's social networking system 140, 142.

If a user wishes for his telephony activity awards to be posted to one or more social networking systems 140, 142, the user could make use of the user interface 214 to register the telephony activity award system 200 with the user's social networking system 140, 142. This would allow the telephony activity award system 200 to acquire the user's social networking system credentials so that the telephony activity award system 200 can post awards to the user's social networking system 140, 142 in the same way the user can make a posting. This information would be provided to the award posting unit 216 of the telephony activity award system 200.

Once registered, the user can direct that all awards the user earns be automatically posted to the user's account on a social networking system 140, 142 by the award posting unit 216. Alternatively, each time that the user earns an award, the award posting unit 216 could ask the user for permission to post the award on a social networking system 140, 142 associated with the user. The award would only be posted to the user's account on the social networking system 140, 142 if the user grants permission. The award posting unit 216 might ask the user if the user wishes to make any comments that will be posted along with the award. If the user provides comments, the user's comments would form part of the posting.

Figure 4:
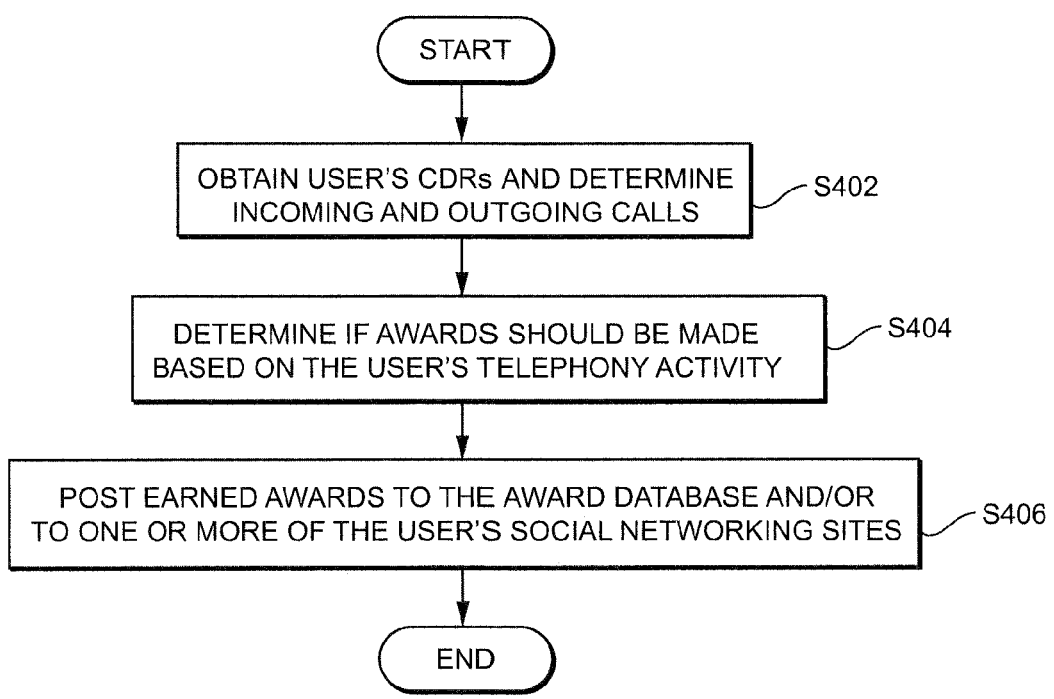
FIG. 4 is diagram illustrating steps of a method of granting awards to a user based on the user's telephony activity.

FIG. 4 illustrates steps of a general method of determining when to grant a user a telephony activity award. In step S402, the call analysis unit 202 obtains information about a user's telephony activity from a CDR database 220. Of course, information about the user's telephony activity could also be obtained from alternate sources.

In step S404, the call analysis unit 202 determines if one or more awards should be granted to the user based on the obtained information about the user's telephony activity. The analysis could make use of information from the rules engine 204, the telephone number association database 206 and/or the call counters 210.

In step S406, the award posting unit 216 posts any earned awards to the award database 212, which is viewable by the user through the user interface 214. Alternatively, or in addition, the award posting unit 216 posts the awards to the user's account on one or more social networking systems 140, 142.

Figure 5:
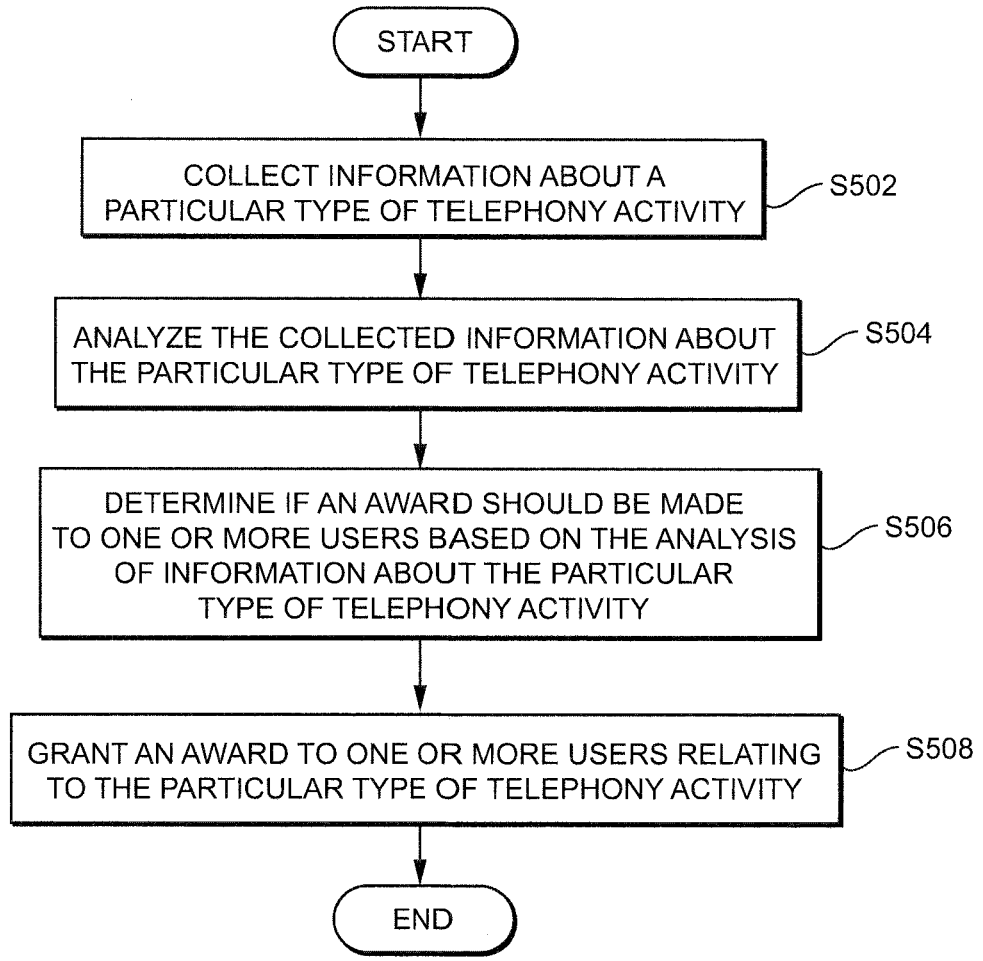
FIG. 5 is diagram illustrating steps of a method of granting awards to users based on the degree to which the users have engaged in a predetermined type of telephony activity.

An alternate method for determining when one or more users should be granted an award is illustrated in FIG. 5. The method begins in step S502, when the call analysis unit 202 obtains information about a particular type of telephony activity for multiple users. In step S504, the call analysis unit 202 analyzes the collected information. This analysis could include determining which users engaged in the most of a particular type of telephony activity. And this information could be determined from information obtained from the call detail record database 220, and/or from the call counters 210.

In step S506, the call analysis unit 202 would determine if an award is to be granted to one or more users for engaging in the particular type of telephony activity. In some instances, only a single award is granted to the user with the greatest amount of the particular type of telephony activity. In other instances, multiple awards are granted for those users who engaged in the greatest amounts of the particular type of telephony activity.

In step S508, the awards would be granted by the award posting unit 216. As noted above, this could merely involve posting the awards to the awards database 212. Or, this could also involve posting the awards the social networking systems 140, 142 of the users.

Figure 6:
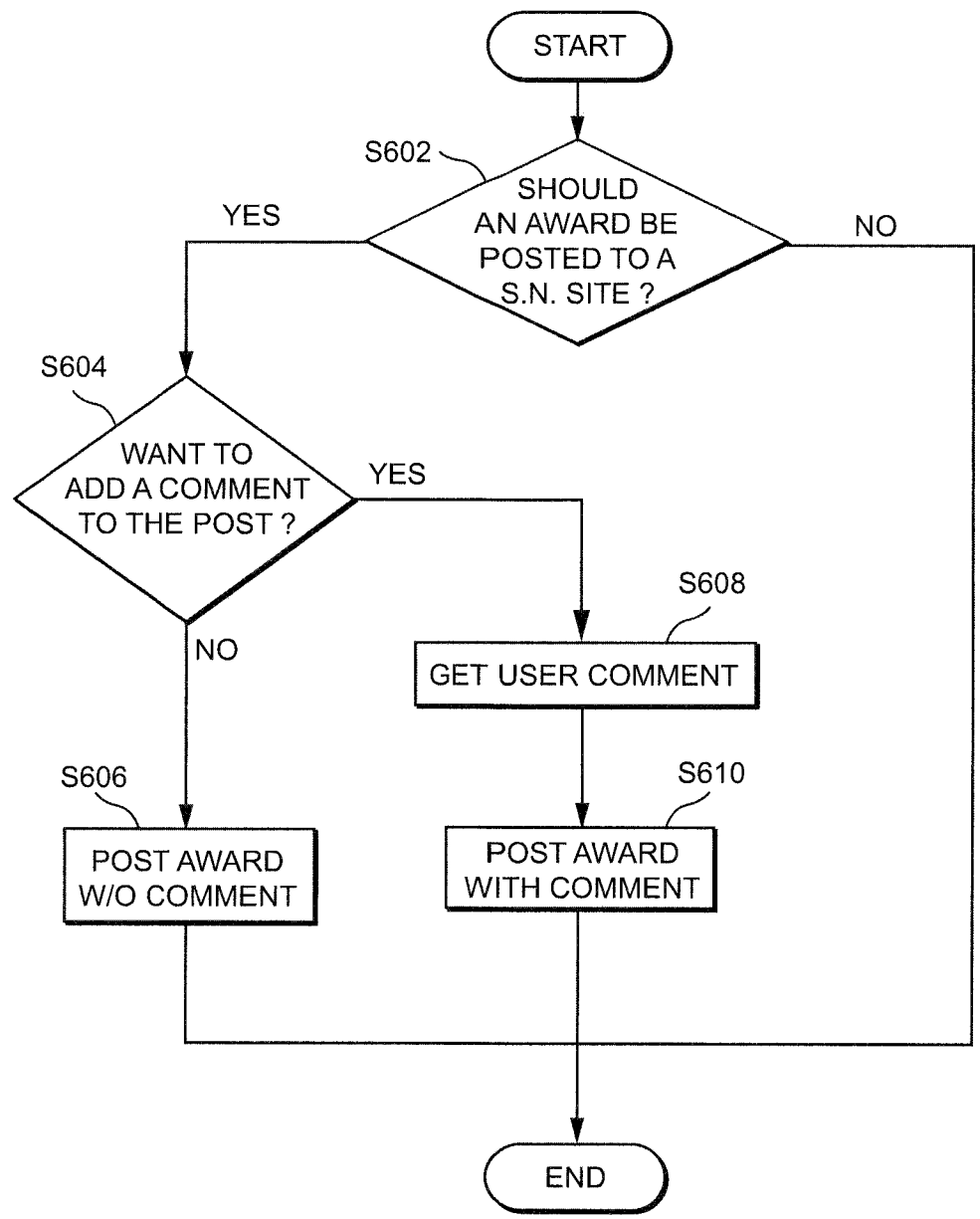
FIG. 6 is a diagram illustrating steps of a method of posting an award on a social networking site associated with a user.

FIG. 6 illustrates steps of a method performed by the award posting unit 216 when an award is granted to a user. The method begins with step S602, wherein the award posting unit 216 determines if an award is to be posted to the user's social networking system 140, 142. As noted above, the user could instruct that all awards are to be posted to the social networking system 140, 142, or that no awards are to be posted. The user could also instruct that the system ask the user before posting an earned award. If the user has instructed the system to ask before posting an award, the question would be posed to the user in step S602.

If the answer is positive, the method proceeds to step S604 where the award posting unit 216 asks the user if the user wishes to post comments along with the award. If not, the method proceeds to step S606, and the award posting unit 216 posts the award on the users account with the social networking system 140, 142.

If the user does wish to post comments with the award, the method proceeds to step S608, where the award posting unit 216 requests and receives the user's comments. Thereafter, the method proceeds to step S610, and the award is posted to the user's account on the social networking system 140, 142 along with the user's comments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of granting an award to a telephony communications system user based on the user's telephony activity, comprising:
    collecting information about the user's telephony activity based on multiple telephony communications with the user;
    analyzing the collected information to identify one or more patterns in the multiple telephony communications;
    determining if an award should be made to the user based on the identified one or more patterns in the multiple telephony communications; and
    granting an award to the user specific to a type of pattern in the multiple telephony communications if an award should be made.

2. The method of claim 1, wherein the collecting step comprises obtaining information about the user's telephony activity from call detail records.

3. The method of claim 1, wherein the collecting step comprises collecting information about the user's telephony activity that occurred within a predetermined period of time.

4. The method of claim 1, wherein the analyzing step includes taking into account the identity of the parties who initiated incoming telephony communications directed to the user.

5. The method of claim 1, wherein the analyzing step includes taking into account the identity of the parties to whom the user sent outgoing telephony communications.

6. The method of claim 1, wherein the analyzing step includes taking into account the geographical locations to which the user sent outgoing communications.

7. The method of claim 1, wherein the analyzing step includes taking into account the geographical locations from which the user received incoming communications.

8. The method of claim 1, wherein the analyzing step includes taking into account the frequency with which the user sent outgoing communications to a particular person or business.

9. The method of claim 1, wherein the granting step comprises making the award available to the user via a user interface.

10. The method of claim 1, wherein the granting step comprises posting the award on a social networking system with which the user is associated.

11. The method of claim 10, wherein posting the award on a social networking system comprises posting the award on the social networking site using the user's credentials with the social networking system.

12. The method of claim 10, further comprising:
asking the user for comments that will be posted with the award; and
receiving comments the user wishes to have posted with the award, wherein comments received from the user are posted on the social networking system along with the award.

13. The method of claim 1, wherein the grant of an award is based on the activity of a plurality of users.

14. The method of claim 13, further comprising:
collecting information about a predetermined type of telephony activity for multiple users of a telephony system;
determining which of the multiple users have experienced the most of the predetermined type of telephony activity; and
granting an award to one or more of the multiple users who have experienced the most of the predetermined type of telephony activity.

15. The method of claim 14, wherein the collecting step comprises collecting information about a predetermined type of telephony activity for the multiple users that has occurred over a predetermined period of time.

16. The method of claim 14, wherein the collecting step comprises collecting information about communications sent from the multiple users to a particular geographical location.

17. The method of claim 14, wherein the collecting step comprises collecting information about communications sent from the multiple users to a particular type of business.

18. The method of claim 1, wherein the award includes a title indicative of the type of pattern for which the award has been granted.

19. The method of claim 1, wherein the award represents a trophy collected by the user and associated to the type of pattern for which the award has been granted.

20. The method of claim 1, wherein the multiple telephony communications are multiple telephone calls.

21. A system for granting an award to a telephony communications system user based on the user's telephony activity, comprising:
means for collecting information about the user's telephony activity based on multiple telephony communications with the user;
means for analyzing the collected information to identify one or more patterns in the multiple telephony communications;
means for determining if an award should be made to the user based on the identified one or more patterns in the multiple telephony communications; and
means for granting an award to the user specific to a type of pattern in the multiple telephony communications if an award should be made.

22. A system for granting an award to a telephony communications system user based on the user's telephony activity, comprising:
a data collection unit that collects information about the user's telephony activity based on multiple telephony communications with the user;
an analysis unit that analyzes the collected information to identify one or more patterns in the multiple telephony communications and that determines if an award should be made to the user based on the identified one or more patterns in the multiple telephony communications; and
a granting unit that grants an award to the user specific to a type of pattern in the multiple telephony communications based on the output of the analysis unit.

23. The system of claim 22, wherein the analysis unit analyzes information about a single user's telephony activity, and wherein the award unit makes an award to the user if the user's telephony activity satisfies one or more award rules.

24. The system of claim 22, wherein the granting unit grants an award to a user based on the telephony activity of multiple users.

25. The system of claim 24, wherein the data collection unit collects information about a predetermined type of telephony activity for multiple users of the telephony system, wherein the analysis unit determines which of the multiple users have experienced the most of the predetermined type of telephony activity, and wherein the granting unit makes an award to one or more of the multiple users who have experienced the most of the predetermined type of telephony activity.

26. The system of claim 25, wherein the data collection unit collects information about a predetermined type of telephony activity for the multiple users that has occurred over a predetermined period of time.

27. The system of claim 25, wherein the collection unit collects information about communications sent from the multiple users to a particular geographical location.

28. The system of claim 25, wherein the collection unit collects information about communications sent from the multiple users to a particular type of business.

29. The system of claim 22, wherein the data collection unit obtains information about the user's telephony activity from call detail records.

30. The system of claim 22, wherein the data collection unit collects information about the user's telephony activity that occurred within a predetermined period of time.

31. The system of claim 22, wherein the analysis unit takes into account the identity of the parties who initiated incoming telephony communications directed to the user.

32. The system of claim 22, wherein the analysis unit takes into account the identity of the parties to whom the user sent outgoing telephony communications.

33. The system of claim 22, wherein the analysis unit takes into account the geographical locations to which the user sent outgoing communications.

34. The system of claim 22, wherein the analysis unit takes into account the geographical locations from which the user received incoming communications.

35. The system of claim 22, wherein the analysis unit takes into account the frequency with which the user sent outgoing communications to a particular person or business.

36. The system of claim 22, wherein the granting unit makes the award available to the user via a user interface.

37. The system of claim 22, wherein the granting unit posts the award on a social networking system with which the user is associated.

38. The system of claim 37, wherein the granting unit posts the award on a social networking system using the user's credentials with the social networking system.

39. The system of claim 37, wherein the granting unit asks the user for comments that will be posted with the award, wherein the granting unit receives comments the user wishes to have posted with the award, and wherein the granting unit posts any received user's comments on the social networking system along with the award.

* * * * *